United States Patent Office 3,836,499
Patented Sept. 17, 1974

3,836,499
THERMOPLASTIC MOULDING COMPOSITION AND MOULDINGS OF POLYCARBONATE, HAVING IMPROVED EASE OF MOULD RELEASE WHEN INJECTION MOULDING
Hermann Schirmer and Gunter Peilstocker, Krefeld-Bockum, Germany, assignors to Bayer Aktiengesellschaft, Leverkusen, Germany
No Drawing. Filed Jan. 8, 1973, Ser. No. 321,594
Claims priority, application Germany, Apr. 25, 1972, P 22 20 185.0
Int. Cl. C08g 51/36
U.S. Cl. 260—31.2 R          8 Claims

ABSTRACT OF THE DISCLOSURE

The invention relates to thermoplastic moulding compositions made of polycarbonates based on aromatic bishydroxy compounds which may contain fillers, dyestuffs, pigments, stabilisers and/or glass fibres, characterised in that they contain 0.1 to 2% by weight, relative to polycarbonate, of one or several esters of saturated aliphatic long-chain monocarboxylic acids and univalent aliphatic long-chain alcohols.

---

The invention relates to thermoplastic moulding compositions of polycarbonates based on aromatic bis-hydroxy compounds, containing certain esters.

It has been found that additions of esters of univalent long-chain alcohols with long-chain univalent fatty acids to polycarbonates based on aromatic bis-hydroxy compounds result in an improvement in the ease of mould release of these polymeric products when injection-moulding. These esters of univalent alcohols can be used either individually or as mixtures with one another.

The subject of the present invention are thus thermoplastic moulding compositions of polycarbonates based on aromatic bis-hydroxy compounds, characterised in that they contain 0.1 to 2 percent by weight, relative to polycarbonate, of one or more esters of saturated aliphatic long-chain monocarboxylic acids and univalent aliphatic long-chain alcohols.

With regard to the structure and processing temperature of polycarbonate it was not foreseeable that the esters according to the invention would be suiatble as additions to improve the ease of mould release, particularly since the esters hitherto tested, for example those of benzoic acid, adipic acid or phthalic acid with univalent and bivalent alcohols cause trans-esterification and a worsening of the properties in particular of the notched impact strength at processing temperatures of more than 300° C., which are customary for polycarbonates. In addition these compounds only show a slight improvement in mould release.

Against this, it has been found, surprisingly, that the esters according to the invention facilitate mould release, especially in the case of injection-moulding compositions of polycarbonate, without at the same time exerting a harmful influence, that is to say without causing a quality-lowering degradation of the polycarbonate. The amount added is 0.1 to 2.0 percent by weight, relative to polycarbonate.

The incorporation is effected by applying the substances, which are normally in the form of a powder, to the granules of polycarbonate of tumbling and subsequently extruding through an extruder, at approx. 270° C., to give a ribbon which is again granulated. The additive does not manifest itself disadvantageously either as regards the transparency or as regards the colour. Furthermore, fillers, dyestuffs, pigments, stabilisers against U.V. and against the action of heat, glass fibres and/or other additives can also have been or be added to the polycarbonate without impairing the effectiveness of the mould release agent.

The mould release agent can already be incorporated when the polycarbonate is manufactured. In this case, the ester is dissolved in a solvent and is metered into the solvent used in the manufacture of the polycarbonate, before evaporation.

A further advantage of the mould release agents according to the invention is that so-called colour concentrates for colouring the polycarbonate can be manufactured with the aid of these substances. By a colour concenrtate there is understood, for example, a mixture of fused mould release agent and carbon black. Fine division of the pigment, that is to say, for example, of the carbon black, can be achieved by grinding on a triple roll mill. These pastes, also called colour concentrates, can without difficulty, above all as regards handling the added pigment, be metered into the polycarbonate to colour it. The polycarbonate granules coloured in this way not only show good mould release, but also good distribution of the pigment, on injection-moulding. In addition to carbon black, practically all coloured pigments and white pigments can be incorporated into the polycarbonate in this way.

High molecular, thermoplastic polycarbonates of bis-hydroxy compounds in the sense of the invention are the known polycarbonates which are manufactured from dihydric phenols, such as resorcinol, hydroquinone, from dihydroxydiphenylene and especially from bis-(hydroxyphenyl)-alkanes, such as e.g. bis-(4-hydroxyphenyl)-propane-2.2 (Bisphenol A), bis-(4-hydroxy-3,5-dimethylphenyl)-propane-2.2, from trinuclear bisphenols such as $\alpha,\alpha'$-bis-(4-hydroxyphenyl)-p-diisopropyl-benzene, from halogenated bis-(hydroxyphenyl)-alkanes, such as, for example, 4,4'-dihydroxy-3,5, 3', 5'-tetrachlorodiphenylpropane-2.2 or 4,4'-dihydroxy-3,5, 3', 5'-tetrabromodiphenylpropane - 2.2, bis-(hydroxyphenyl)-cycloalkanes, -sulphones, -sulphoxides, -ethers or -sulphides, optionally mixed with glycols, and derivatives of carbonic acid, for example its diesters or dihalides, optionally conjointly using minor amounts of dicarboxylic acid or their derivatives which are suitable for ester formation, these polycarbonates possessing an average molecular weight of at least about 10.000, preferably of between about 25.000 and about 200.000.

Esters which are effective in accordance with the invention are the reaction products obtainable according to known processes of univalent $C_{10}$–$C_{35}$ alcohols, such as, for example, decyl alcohol, dodecyl alcohol, lauryl alcohol, myristyl alcohol, cetyl alcohol ($C_{16}H_{33}OH$), stearyl alcohol, ceryl alcohol ($C_{26}H_{53}OH$), myricyl alcohol, with aliphatic saturated monocarboxylic acids between pelargonic acid ($C_8H_7$—COOH) and cerotic acid $$(C_{25}H_{51}.COOH),$$

there being mentioned in addition of the two above-mentioned monocarboxylic acids, e.g. capric acid, lauric acid, myristic acid, palmitic acid, stearic acid, arachic acid, behenic acid, and lignoceric acid.

Examples of the esters to be used according to the invention are cerotic acid ceryl ester, cerotic acid myricyl ester and palmitic acid myricyl ester.

Mixtures of such esters which occur naturally for example are also very effective.

The effect of the esters according to the invention, in assisting mould release can be measured with the aid of the mould release forces required when releasing injection-moulding compositions from the mould.

In the examples which follow, these are measured by rendering visible the pressure which builds up in the oil cylinder of the ejector system during mould release by means of an optical and at the same time pen-recording indicator instrument.

Example 1

0.5 kg. of an ester, which contains ceryl alcohol as the alcohol and the radical of cerotic acid as the acid radical, is added to 99.5 kg. of polycarbonate granules based on Bisphenol A and phosgene, of relative viscosity 1.302, measured in a 0.5% solution in methylene chloride at 25° C. The mixture is tumbled in a drum and is extruded through a single-wave extruder at 270° C. to give a ribbon which is subsequently granulated.

On injection-moulding a cylinder of 10 cm. length, 7 cm. diameter and 3 mm. wall thickness, 17 kp./cm.$^2$ are required for ejection. Without the addition of ester according to the invention, the requisite ejection force is 32 kp./cm.$^2$. A test rod injection-moulded from these granules at 300° C. has the properties described in Table I.

TABLE I

Properties of a polycarbonate which contains 0.5% by wt. of the ester according to Example 1 and is based on Bisphenol A (compared with the corresponding properties of the corresponding ester-free polycarbonate).

|  | With 0.5% ester | Without ester |
|---|---|---|
| Relative viscosity of the granules | 1.299 | 1.302 |
| Relative viscosity of the injection-moulding | 1.297 | 1.300 |
| Limiting flexural stress, kp./cm.$^2$, according to DIN 53 452 | 978 | 980 |
| Notched impact strength, cm. kp./cm.$^2$, according to DIN 53 453 | 48 | 54 |
| Heat distortion point according to Martens, °C | 106 | 108 |
| Break resistance, kp./cm.$^2$, according to DIN 53 455 | 725 | 730 |
| Elongation at break in percent according to DIN 3455 | 116 | 117 |

Example 2

0.5 kg. of an ester, which contains myricyl alcohol as the alcohol and the radical of the cerotic acid as the acid radical, is added to 99.5 kg. of polycarbonate granules based on Bisphenol A and phosgene, of relative viscosity 1.29, measured in a 0.5% solution in methylene chloride at 25° C.

This mixture is tumbled in a drum and extruded through a single-wave extruder at 270° C. to give a ribbon which is granulated.

On injection-moulding a cylinder of 10 cm. length, 7 cm. diameter and 3 mm. wall thickness, 15 kp./cm.$^2$ are required for ejection. Without the addition of ester according to the invention the ejection force is 30 kp./cm.$^2$. A test rod injection-moulded from the ester-containing granules at 300° C. has almost the same ultimate stress values and thermal properties as a test rod which is injection-moulded from ester-free granules at 300° C.

Example 3

0.4 kg. of an ester, which contains myricyl alcohol as the alcohol and the radical of the palmitic acid as the acid radical is added to 99.6 kg. of polycarbonate granules based on Bisphenol A and phosgene, of relative viscosity 1.298, measured in a 0.5% solution in methylene chloride at 25° C.

This mixture is tumbled in a drum and extruded through a single-wave extruder at 270° C. to give a ribbon which is granulated.

On injection-moulding a cylinder of 10 cm. length, 7 cm. diameter and 3 mm. wall thickness, 14 kp./cm.$^2$ are required for ejection. Without the addition of ester the ejection force is 26 kp./cm.$^2$.

A test rod injection-moulded from the ester-containing granules at 300° C. has almost the same ultimate stress values and thermal properties (heat distortion point) as a test rod from ester-free granules, which was manufactured under the same conditions.

Example 4

0.5 kg. of an ester mixture consisting of stearyl alcohol and a mixture of long-chain, unbranched aliphatic saturated $C_{20}$–$C_{24}$ fatty acids (Loxiol G 47, commercial product of the firm of Neynaber) are added to 99.5 kg. of polycarbonate granules of Bisphenol A and phosgene, of relative viscosity 1.295, measured in a 0.5% solution in methylene chloride at 25° C. This mixture is tumbled in a drum and extruded through a single-wave extruder at 270° C. to give a ribbon which is granulated. On injection-moulding a cylinder of 10 cm. length, 7 cm. diameter and 3 mm. wall thickness, 15 kp./cm.$^2$ are required for ejection from the mould. Without the addition of ester the mould release force is 25 kp./cm.$^2$.

The mechanical and thermal properties of the ester-containing injection-moulding compositions are scarcely changed by the addition of this ester mixture.

COMPARATIVE EXAMPLE 0.5 kg. of one of the esters 1 to 6 are added to 99.5 kg. of polycarbonate granules based on Bisphenol A and phosgene, of relative viscosity 1.281, measured in a 0.5% solution in methylene chloride at 25° C. The mixtures are tumbled in a drum and extruded through a single-wave extruder at 270° C. to give a ribbon which is subsequently granulated. On injection-moulding a cylinder of 10 cm. length, 7 cm. diameter and 3 mm. wall thickness, certain mould release forces are measured on ejection from the mould. Without the addition of an ester the requisite ejection force is 33 kp./cm.$^2$. The notched impact strength measured according to DIN 53 453 on a test rod falls to a more or less pronounced extent (see Table 2). It can be seen from Table 2 that the effect of these esters on the ease of mould release is relatively small. On the other hand, pronounced deterioration of the notched impact strength occurs in the case of all esters.

The following esters obtainable according to known processes were used:

1. Ester (acid number 0.1), mol wt. about 750, of adipic acid and 1.2 propyleneglycol
2. Ester (acid number 0.1), mol wt. about 1500, of adipic acid and 1.3-butanediol
3. Ester (acid number 0.1), of phthalic acid and benzyl alcohol 1.3-butanediol (1:1)
4. Ester (acid number 0.1), of phthalic acid and dicyclohexyl alcohol
5. Ester (acid number 0.1), of acetic acid and glycerol
6. Ester (acid number 0.1), of benzoic acid and 1.3-butanediol

TABLE 2

Effect on ease of mould release and notched impact strength by addition of different esters to polycarbonate

|  | Mould release force in kp./cm.$^2$ | Improvement in mould release force in percent | Notched impact strength according to DIN 54353 in cm. kp./cm.$^2$ | Fall in notched impact strength in percent |
|---|---|---|---|---|
| Without addition of ester | 33 | 100 | 49 | 100 |
| Addition of 0.5% ester 1 | 32 | 97 | 10 | 20 |
| Addition of 0.5% ester 2 | 30 | 90 | 19 | 39 |
| Addition of 0.5% ester 3 | 31 | 94 | 22 | 45 |
| Addition of 0.5% ester 4 | 30 | 90 | 16 | 33 |
| Addition of 0.5% ester 5 | 30 | 90 | 24 | 49 |
| Addition of 0.5% ester 6 | 32 | 97 | 17 | 35 |

What is claimed is:

1. A thermoplastic molding composition comprising a high molecular weight thermoplastic polycarbonate having a molecular weight of at least about 10,000, and from about 0.1 to about 2 percent by weight, based on the weight of the thermoplastic polycarbonate, of an ester of a univalent $C_{10}$ to $C_{35}$ alcohol with a saturated aliphatic $C_9$ to $C_{26}$ monocarboxylic acid.

2. The thermoplastic molding composition of Claim 1 wherein the high molecular weight thermoplastic polycarbonate has a molecular weight between 25,000 and 200,000.

3. The thermoplastic molding composition of Claim 1 wherein the high molecular weight thermoplastic polycarbonate is manufactured from dihydric phenols.

4. The thermoplastic molding composition of Claim 1 wherein the ester is a mixture of esters of one or more univalent $C_{10}$ to $_{35}$ alcohols and one or more saturated aliphatic $C_9$ to $C_{26}$ monocarboxylic acids.

5. A thermoplastic molding composition of Claim 1 wherein the univalent $C_{10}$ to $_{35}$ alcohol is selected from the group consisting of decyl alcohol, dodecyl alcohol, lauryl alcohol, myristyl alcohol, cetyl alcohol, stearyl alcohol, ceryl alcohol, myricyl alcohol and mixtures of these.

6. A thermoplastic molding composition of Claim 1 wherein the saturated aliphatic monocarboxylic acid is selected from the group consisting of pelargonic acid, capric acid, lauric acid, myristic acid, palmitic acid, stearic acid, arachic acid, behenic acid, lignoceric acid, cerotic acid and mixtures of these.

7. A thermoplastic molding composition of Claim 1 wherein the ester is selected from the group consisting of cerotic acid ceryl ester, cerotic acid myricyl ester and palmitic acid myricyl ester.

8. A thermoplastic molding composition of Claim 1 wherein the high molecular weight polycarbonate is manufactured from bis-hydroxy compounds selected from the group consisting of resorcinol; hydroquinone; dihydroxy-diphenylene; bis - (hydroxyphenyl) - alkane; trinuclear bisphenols; halogenated bis-(hydroxyphenyl)-alkanes; bis - (hydroxyphenyl) - cycloalkanes; bis - (hydroxyphenyl) - sulphones; bis - (hydroxyphenyl) - sulphoxides; bis-(hydroxyphenyl)-ethers and bis-hydroxyphenyl)-sulphides.

References Cited

UNITED STATES PATENTS 3,186,961    6/1965    Sears _____ 260—31.2 R

ALLAN LIEBERMAN, Primary Examiner

S. L. FOX, Assistant Examiner

U.S. Cl. X.R.

260—37 PC